(12) United States Patent
Xiao et al.

(10) Patent No.: US 9,745,906 B2
(45) Date of Patent: Aug. 29, 2017

(54) METHODS AND SYSTEM FOR IMPROVING COMPRESSOR RECIRCULATION VALVE OPERATION

(71) Applicant: Ford Global Technologies, LLC, Dearborn, MI (US)

(72) Inventors: Baitao Xiao, Canton, MI (US); Adam Nathan Banker, Canton, MI (US); Hamid-Reza Ossareh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 14/566,488

(22) Filed: Dec. 10, 2014

(65) Prior Publication Data
US 2016/0169089 A1   Jun. 16, 2016

(51) Int. Cl.
| F02D 23/00 | (2006.01) |
| F02D 41/00 | (2006.01) |
| F02B 37/16 | (2006.01) |
| F02B 37/18 | (2006.01) |
| F02D 41/22 | (2006.01) |
| F02B 39/16 | (2006.01) |

(52) U.S. Cl.
CPC .......... *F02D 41/0007* (2013.01); *F02B 37/16* (2013.01); *F02B 37/18* (2013.01); *F02D 41/221* (2013.01); *F02B 2039/166* (2013.01); *F02D 2200/0406* (2013.01); *Y02T 10/144* (2013.01); *Y02T 10/40* (2013.01)

(58) Field of Classification Search
CPC ............... F02D 41/0007; F02D 41/221; F02D 2200/0406; F02D 2700/0246; F02D 2700/0248; F02D 2700/0253; F02D 2700/0256; F02D 2700/0279; F02B 37/16; F02B 37/18; F02B 37/13; B02B 2039/166; Y02T 10/144; Y02T 10/40
USPC ........................... 701/103; 60/600, 602, 611
See application file for complete search history.

(56) References Cited

U.S. PATENT DOCUMENTS

| 2,988,070 | A | 6/1961 | Brueder |
| 4,870,822 | A | 10/1989 | Kamimaru |
| 5,079,946 | A | 1/1992 | Motamedi et al. |
| 5,275,136 | A | 1/1994 | Schechter et al. |
| 7,578,128 | B2 | 8/2009 | Miyauchi et al. |
| 8,373,950 | B2 | 2/2013 | Yano et al. |
| 8,661,814 | B2 | 3/2014 | Ulrey et al. |
| 2007/0056282 | A1* | 3/2007 | Iwaszkiewicz ..... F02B 29/0418 60/599 |

(Continued)

OTHER PUBLICATIONS

Watson, N. et al., "Turbocharging the Internal Combustion Engine," John Wiley & Sons, 1982, pp. 129-133, 3 pages.

(Continued)

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

Systems and methods for improving compressor recirculation valve operation of an engine that includes a compressor are presented. The systems and methods adjust a position of a waste gate while the compressor recirculation valve is operated in a closed loop mode to maintain engine intake manifold throttle inlet pressure during a diagnostic mode to adapt operation of the compressor recirculation valve.

20 Claims, 4 Drawing Sheets

(56) References Cited

U.S. PATENT DOCUMENTS

| | | | |
|---|---|---|---|
| 2012/0210710 A1* | 8/2012 | Chevalier | F02B 39/16 60/602 |
| 2012/0210711 A1 | 8/2012 | Petrovic et al. | |
| 2012/0291432 A1 | 11/2012 | Ulrey et al. | |
| 2013/0211693 A1* | 8/2013 | Petrovic | F02D 41/182 701/104 |
| 2014/0260241 A1 | 9/2014 | Jankovic et al. | |
| 2015/0292422 A1* | 10/2015 | Tsunooka | F02B 37/183 60/602 |

OTHER PUBLICATIONS

Xiao, Baitao et al. "Methods and Systems for Real-Time Compressor Surge Line Adaptation," U.S. Appl. No. 14/563,749, filed Dec. 8, 2014, 53 pages.

Ossareh, Hamid-Reza et al., "System and Methods for CBV Diagnostics," U.S. Appl. No. 14/537,216, filed Nov. 10, 2014, 29 pages.

Banker, Adam N. et al., "Diagnostic Method for a Compressor Recirculation Valve," U.S. Appl. No. 14/565,098, filed Dec. 9, 2014, 56 pages.

Ossareh, Hamid-Reza et al., "Methods and System for Determining Compressor Recirculation Valve Sludge," U.S. Appl. No. 14/566,442, filed Dec. 10, 2014, 27 pages.

Banker, Adam N. et al., "Methods and System for Compensating Compressor Recirculation Sludge," U.S. Appl. No. 14/566,395, filed Dec. 10, 2014, 27 pages.

* cited by examiner

METHODS AND SYSTEM FOR IMPROVING COMPRESSOR RECIRCULATION VALVE OPERATION

FIELD

The present description relates to methods and a system for improving operation of an engine that includes a compressor recirculation valve. The methods and systems may be particularly useful in engines having waste gates.

BACKGROUND AND SUMMARY

A turbocharged engine may include a waste gate for controlling compressor speed. If compressor speed exceeds a desired speed the waste gate may be opened to reduce compressor speed via reducing the amount of exhaust energy used to rotate the compressor. However, the compressor has inertia which tends to keep the compressor spinning at its present speed. Further, at least some exhaust gas energy may continue to apply force to the turbine that rotates the compressor. Consequently, opening the waste gate may not provide a timely reduction in pressure at an intake manifold throttle.

One way to quickly decrease pressure at the intake manifold throttle is to install a compressor recirculation valve. The compressor recirculation valve may be placed in parallel with the compressor so that output from the compressor may be rerouted back to the compressor input, thereby reducing pressure at the compressor outlet and the engine intake manifold throttle. Nevertheless, the compressor recirculation valve may be exposed to fuel vapors and matter inducted to the engine so that flow through the compressor recirculation valve becomes restricted. If flow through the compressor recirculation valve becomes restricted, it may be more difficult to control pressure upstream of an intake manifold throttle inlet. As a result, engine air-fuel ratio control may be more difficult.

The inventors herein have recognized the above-mentioned issues and have developed a diagnostic method, comprising: at least partially opening a waste gate and adjusting a compressor recirculation valve to a closed position in response to a diagnostic request; at least partially closing the waste gate after at least partially opening the waste gate; adjusting a compressor recirculation valve airflow offset in response to a position the compressor recirculation valve is adjusted to maintain a central throttle inlet pressure responsive to the at least partially closing the waste gate; and operating the compressor recirculation valve in response to the airflow offset.

By adjusting a compressor recirculation valve airflow offset in response a position of the compressor recirculation valve after a waste gate is at least partially closed, it may be possible to provide the technical result of improving engine air intake pressure control even when deposits are formed within a compressor recirculation valve. For example, the compressor recirculation valve may be operated in a closed loop mode in response to a request to adapt operation of the compressor recirculation valve. Closing the waste gate increases compressor output so that flow through the compressor recirculation valve needs to be increased to maintain a constant pressure at the engine intake manifold or central throttle inlet. In closed loop control, the compressor recirculation valve opens to maintain the constant pressure at the engine intake manifold throttle inlet. The amount that the compressor recirculation valve has to open to return engine intake manifold throttle inlet pressure to its initial value is monitored. A non-degraded compressor recirculation valve will open a small amount while a degraded compressor recirculation valve will need to open a greater amount to restore the engine intake manifold throttle inlet pressure. The amount of opening relative to the nominal amount of opening is the compressor recirculation valve offset. The compressor recirculation valve may be controlled according to a transfer function that includes the revised offset to improve compressor recirculation valve control.

The present description may provide several advantages. In particular, the approach may improve engine airflow control at low driver demand levels. Further, the approach may improve engine air-fuel ratio control during accelerator pedal tip-out conditions. Further, the approach may be applied to turbocharged or supercharged engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
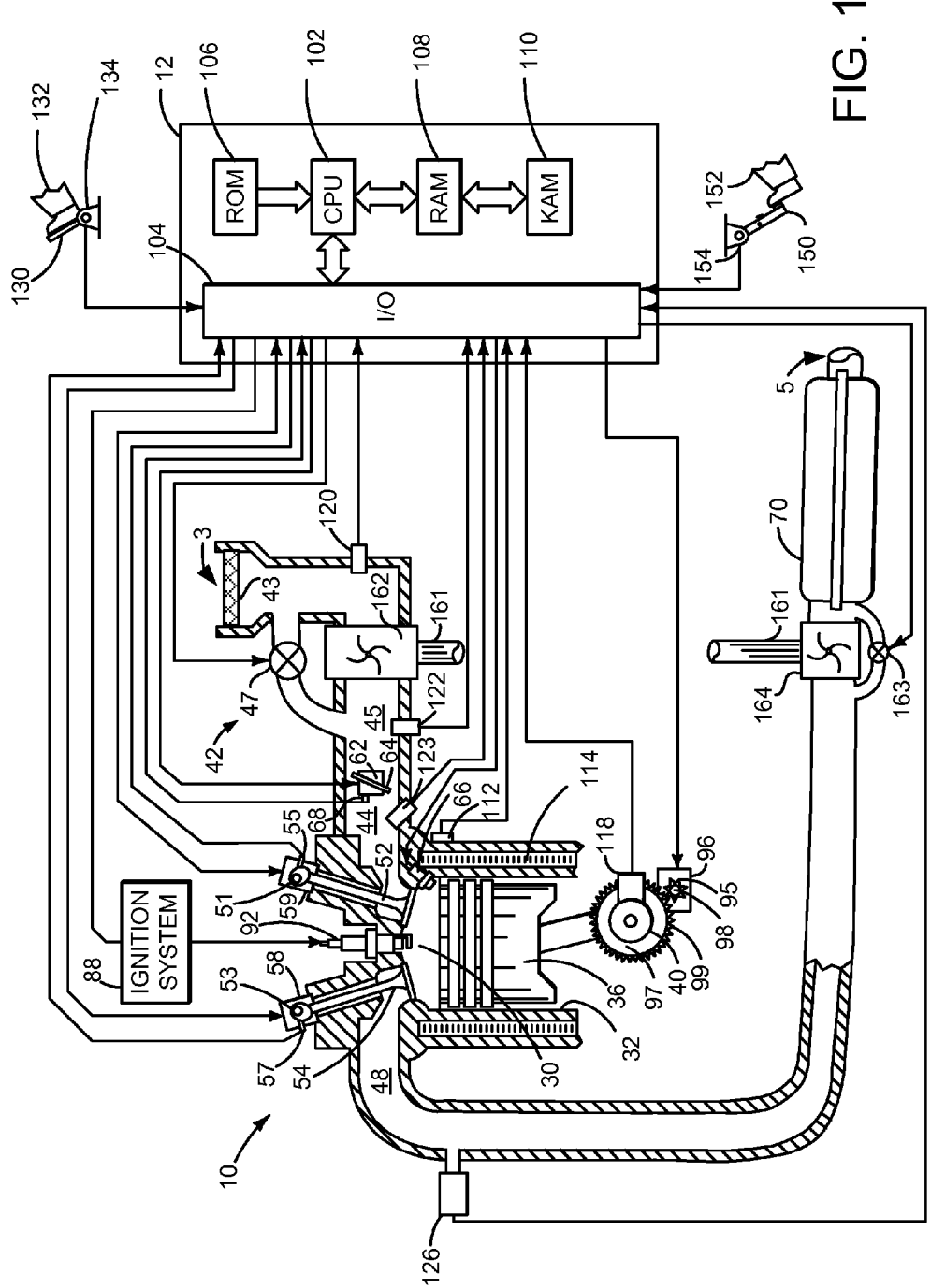
FIG. 1 is a schematic diagram of an engine.

The present description is related to operating an engine with a compressor recirculation valve. The compressor recirculation valve may be incorporated into an engine as is shown in FIG. 1. The compressor recirculation valve may exhibit flow characteristics similar to those shown in FIG. 2. The engine may be part of a system that includes a controller with instructions for the method of FIG. 3. The system of FIG. 1 and the method of FIG. 3 may operate to provide the sequence of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain.

In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Combustion byproducts are exhausted at outlet 5 which is exposed to ambient temperature and pressure. Piston 36 and combustion chamber 30 operate as a pump when engine 10 rotates and combusts air and fuel. Air is drawn from inlet 3 and exhaust products are expelled at outlet 5. Inlet 3 is upstream of outlet 5 according to the direction of flow through engine 10, exhaust manifold 48, and engine air intake 42. Upstream of engine 10 does not include anything outside the engine past the inlet, and downstream of engine 10 does not include anything outside the engine past the outlet.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provides for a system, comprising: an engine; a turbocharger including a compressor mechanically coupled to the engine, the turbocharger including a waste gate; a recirculation valve positioned in an air intake of the engine in parallel with the compressor; and a controller including instructions stored in non-transitory memory for at least partially closing an at least partially open waste gate and adjust a transfer function of the recirculation valve based on the at least partially closing the at least partially open waste gate in response to a request to adapt operation of the recirculation valve. The system further comprises additional instructions to closed loop control the recirculation valve to maintain a constant engine intake manifold throttle inlet pressure.

In some examples, the system includes where an offset value of the transfer function is adjusted. The system further comprises additional instructions to maintain a constant engine air flow via adjusting a position of an engine intake manifold throttle. The system includes where the recirculation valve is initially closed in response to the request to adapt operation of the recirculation valve. The system further comprises additional instructions for exiting a recirculation valve diagnostic mode in response to an increase in driver demand torque. The system further comprises additional instructions to operate the recirculation valve in response to the transfer function.

Figure 2:
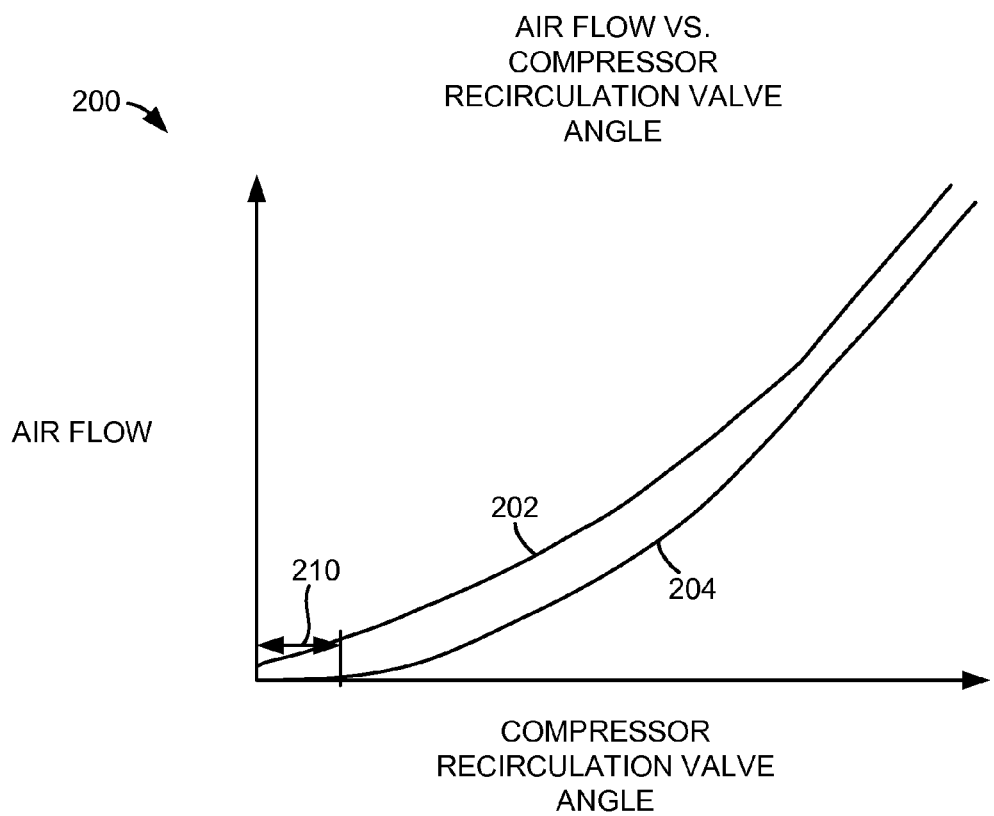
FIG. 2 is a plot shown flow of a throttle and flow of a throttle with deposits.

Referring now to FIG. 2, a prophetic plot of airflow versus compressor recirculation valve angle for a fixed pressure drop across a compressor recirculation valve is shown. The X axis represents compressor recirculation valve angle. The angle increases in the direction of the X axis arrow and the compressor recirculation valve opening amount increases as the angle increases. The Y axis represents airflow through the compressor recirculation valve. Curve 202 represents characteristics for a compressor recirculation valve that is free of deposits, and curve 204 represents characteristics for a compressor recirculation valve that has deposits. Deposits may form from fuel vapors and/or material inducted into the engine. Curves 202 and 204 may be referred to as compressor recirculation valve transfer functions since they describe compressor recirculation input (e.g., angle) versus output (e.g., airflow) for a given pressure ratio across the compressor recirculation valve.

The plot shows that the compressor recirculation valve with deposits (e.g., curve 204) begins to allow air flow at a greater angle than the compressor recirculation valve without deposits (e.g., curve 202). The deposits may partially restrict flow through the compressor recirculation valve. Therefore, if a controller adjusts an angle of the compressor recirculation valve with deposits, there may not be airflow for conditions where the controller is expecting airflow. Consequently, it may be more difficult to control pressure at a location upstream of a central throttle or engine intake manifold throttle. Leader 210 shows an offset between curve 202 and curve 204. The offset represents a compressor recirculation valve angle difference between where airflow begins through the compressor recirculation valve without deposits and the compressor recirculation valve with deposits. Thus, by determining when airflow begins through the compressor recirculation valve, the offset in compressor recirculation valve angle may be determined.

Figure 3:
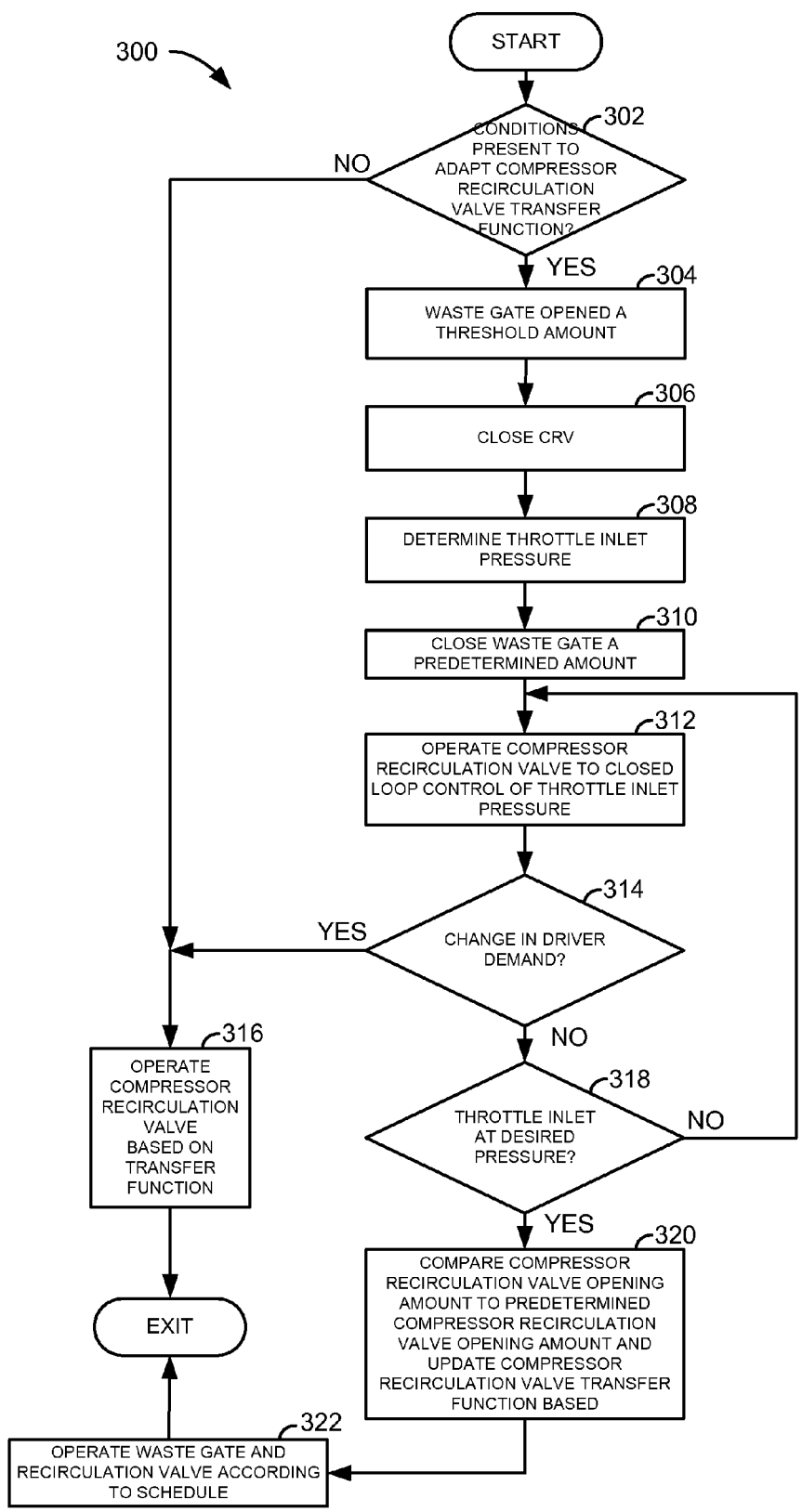
FIG. 3 shows an example method for operating an engine.

Referring now to FIG. 3, a method for operating an engine is shown. The method of FIG. 3 may provide the operating sequence shown in FIG. 4. Additionally, the method of FIG. 3 may be included in the system of FIG. 1 as executable instructions stored in non-transitory memory.

At 302, method 300 judges if conditions are present for adapting a compressor recirculation valve transfer function. In one example, conditions may be present for adapting or revising a compressor recirculation valve transfer function when the engine is operating within a predetermined engine speed and load range. A request to enter a compressor recirculation valve diagnostic mode may be made in response to conditions being present for adapting the compressor recirculation valve transfer function. Further, it may be desirable to operate the engine at a substantially constant engine speed and load (e.g., changing by less than five percent). If method 300 judges that conditions are present for adapting the compressor recirculation valve transfer function, the answer is yes and method 300 proceeds to 304. Otherwise, the answer is no and method 300 proceeds to 316.

At 316, method 300 operates the compressor recirculation valve based on the compressor recirculation valve's present transfer function. For example, if the pressure in the boost chamber or inlet of the engine's throttle is greater than desired, the compressor recirculation valve may be adjusted to an angle where airflow through the compressor recirculation valve begins to increase based on the compressor recirculation valve's transfer function. In this way, the engine intake manifold throttle inlet pressure may be maintained or adjusted to a desired level. In some examples, the compressor recirculation valve position may be adjusted in response to a difference between a desired engine throttle inlet pressure and an actual engine throttle inlet pressure. Method 300 proceeds to exit after the compressor recirculation valve position is adjusted according to the present compressor recirculation valve transfer function.

At 304, method 300 positions the turbocharger waste gate to a predetermined desired open position. The open position may be partially or fully open. By opening the waste gate, compressor output is reduced. Method 300 proceeds to 306 after the waste gate position is adjusted.

At 306, method 300 fully closes the compressor recirculation valve. By closing the compressor recirculation valve, it may be established that airflow through the compressor recirculation valve is substantially zero (e.g., less than one percent of maximum flow through the compressor recirculation valve). Method 300 proceeds to 308 after the compressor recirculation valve is closed.

At 308, method 300 determines engine intake manifold throttle inlet pressure. Throttle inlet pressure may be measured via a sensor or inferred. Method 300 proceeds to 310 after throttle inlet pressure is determined.

At 310, method 300 closes a turbocharger waste gate a predetermined amount. By closing the turbocharger waste gate, additional exhaust gas energy is supplied to the turbocharger compressor, thereby increasing compressor output or airflow. The waste gate may be partially closed. Method 300 proceeds to 312 after the waste gate is at least partially closed.

At 312, method 300 operates the compressor recirculation valve in closed loop mode to control engine intake throttle inlet pressure. In one example, actual or measured throttle inlet pressure is subtracted from a desired throttle pressure and the result is the basis for adjusting the compressor recirculation valve position. For example, the result may be multiplied by proportional and integral terms, the result may be added together, and the result is the control command provided to a motor or actuator that adjusts a position of the compressor recirculation valve. If the throttle inlet pressure is greater than desired, the compressor recirculation valve may be partially opened. If the throttle inlet pressure is less than desired, the compressor recirculation valve may be partially closed. Method 300 proceeds to 314 after the compressor recirculation valve is closed loop controlled to maintain a substantially constant throttle inlet pressure (e.g., pressure varying less than 10%).

At 314, method 300 judges if there has been a change in driver demand torque greater than an absolute threshold amount after the compressor recirculation valve was closed at 304. If so, the answer is yes and method 300 proceeds to 316 and exits the compressor recirculation valve adaption or revision mode. Otherwise, the answer is no and method 300 proceeds to 318.

At 318, method 300 judges if the engine intake manifold throttle inlet pressure is at a desired pressure. The actual throttle inlet pressure may be compared to the desired pressure to determine if throttle inlet pressure is at the desired throttle inlet pressure. If the throttle inlet pressure is at the desired throttle inlet pressure, the answer is yes and method 300 proceeds to 320. Otherwise, the answer is no and method 300 returns to 312 where the compressor recirculation valve is closed loop controlled to converge the throttle inlet pressure to the desired throttle inlet pressure. The desired throttle inlet pressure may be empirically determined and stored to memory.

At 320, method 300 updates or revises the offset value in the compressor recirculation transfer function. When the compressor recirculation valve is new, it opens a base nominal amount or angle to allow air flow through itself. The amount of opening or the angle the compressor recirculation valve is closed loop opened to provide the desired throttle inlet pressure relative to the base nominal amount or angle is the compressor recirculation offset. The offset value in the transfer function may be revised to the offset that provides the desired throttle inlet pressure. The remaining values in the transfer function may be revised based on the present offset value. In one example, the values in the transfer function are adjusted to empirically determined values based on the offset value. Method 300 proceeds to 322 after the compressor recirculation valve transfer function is revised.

At 322, method 300 operates the compressor recirculation valve based on the revised compressor recirculation valve transfer function according to predetermined scheduled operation. For example, if pressure at the throttle inlet is greater than desired, the compressor recirculation valve position may be adjusted to the offset value so that air flows through the compressor recirculation valve, thereby reducing the throttle inlet pressure. Additionally, the engine throttle and waste gate are operated according to schedule (e.g., based on engine speed, load, and driver demand torque). Thus, engine throttle control, waste gate control, and compressor recirculation valve control are returned to standard operation when the compressor recirculation valve adaption mode is complete. Method 300 proceeds to exit after the waste gate and compressor recirculation valve resume standard operation.

Thus, the method of FIG. 3 provide for a diagnostic method, comprising: at least partially opening a waste gate and adjusting a compressor recirculation valve to a closed position in response to a diagnostic request; at least partially closing the waste gate after at least partially opening the waste gate; adjusting a compressor recirculation valve airflow offset in response to a position the compressor recirculation valve is adjusted to maintain a central throttle inlet pressure responsive to the at least partially closing the waste gate; and operating the compressor recirculation valve in response to the airflow offset. The method includes where the diagnostic request is a request to adjust the compressor recirculation valve airflow offset.

In some examples, the method further comprises adjusting a position of a central throttle to maintain a substantially constant (e.g., changes less than ±5 percent) engine airflow. The method includes where the compressor recirculation valve is operated in a closed loop mode where compressor recirculation valve position is adjusted in response to the central throttle inlet pressure. The method includes where the compressor recirculation valve is at least partially opened in response to the at least partially closing the waste gate. The method includes where the waste gate is at least partially closed in a step-wise manner in a compressor recirculation valve adaptation mode, and further comprising exiting the compressor recirculation valve adaptation mode in response to an increase in driver demand torque. The method includes where the recirculation valve airflow offset is an opening position of the compressor recirculation valve where airflow greater than a threshold amount is present.

The method of FIG. 3 also provides for a diagnostic method, comprising: partially opening a waste gate, adjusting a compressor recirculation valve to a closed position, and maintaining a constant engine throttle inlet pressure via adjusting a position of the compressor recirculation valve in response to a diagnostic request after the compressor recirculation valve has closed; at least partially closing the waste gate after the compressor recirculation valve is closed; adjusting a recirculation valve transfer function in response to a position of the compressor recirculation valve where the constant engine throttle inlet pressure is maintained after the waste gate is at least partially closed; and operating the compressor recirculation valve in response to the compressor recirculation valve transfer function.

In some examples, the method includes where the compressor recirculation valve is closed loop controlled responsive to engine intake throttle inlet pressure. The method includes where the diagnostic request is a compressor recirculation valve diagnostic request. The method includes where the diagnostic request initiates a diagnostic mode, and further comprising adjusting an engine intake manifold throttle to provide a constant engine air flow during the diagnostic mode. The method further comprises exiting the diagnostic mode in response to an increase in driver demand torque. The method includes where the compressor recirculation valve is positioned in parallel with a compressor.

Figure 4:
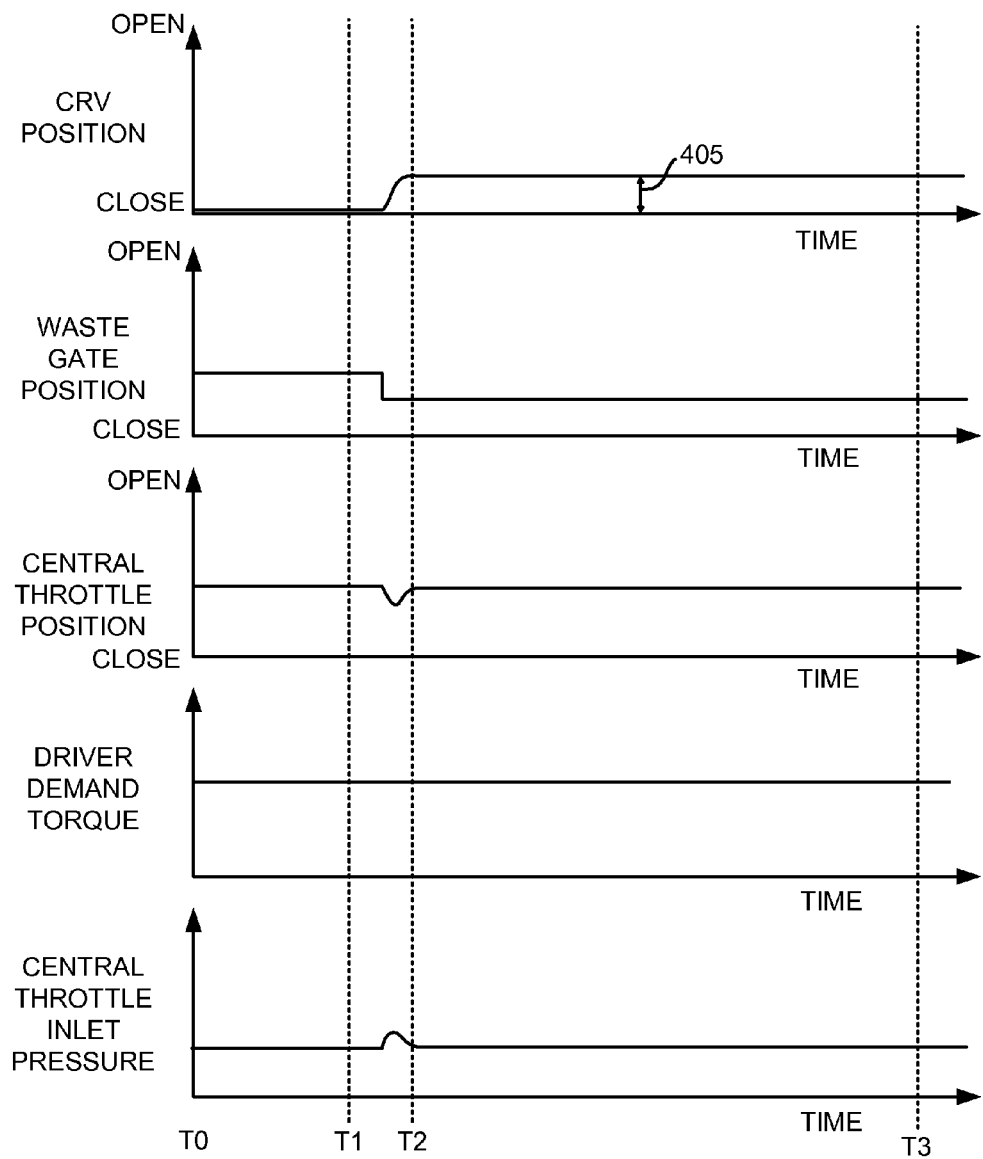
FIG. 4 shows an engine operating sequence based on the method of FIG. 3.

Referring now to FIG. 4, a sequence for operating an engine according to the method of FIG. 3 is shown. The sequence may be provided via the system of FIG. 1. Vertical lines at time T1-T3 represent times of interest during the sequence.

The first plot from the top of FIG. 4 is a plot of compressor recirculation valve (CRV) position versus time. The Y axis represents CRV position and the CRV opening amount increases in the direction of the Y axis arrow. The X axis represents time and time increases from the left side of the figure to the right side of the figure.

The second plot from the top of FIG. 4 is a plot of turbocharger waste gate position versus time. The Y axis represents turbocharger waste gate position and the waste gate opening amount increases in the direction of the Y axis arrow. The X axis represents time and time increases from the left side of the figure to the right side of the figure.

The third plot from the top of FIG. 4 is a plot of the engine's central throttle position versus time. The Y axis represents central throttle position and the central throttle opening amount increases in the direction of the Y axis arrow. The X axis represents time and time increases from the left side of the figure to the right side of the figure.

The fourth plot from the top of FIG. 4 is a plot of driver demand torque versus time. The Y axis represents driver demand torque and driver demand torque increases in the direction of the Y axis arrow. The X axis represents time and time increases from the left side of the figure to the right side of the figure.

The fifth plot from the top of FIG. 4 is a plot of engine central throttle inlet pressure versus time. The Y axis represents engine central throttle inlet pressure versus time and the engine throttle inlet pressure increases in the direction of the Y axis arrow. The X axis represents time and time increases from the left side of the figure to the right side of the figure.

At time T0, the engine is not in a compressor recirculation valve diagnostic mode and the compressor recirculation valve (CRV) position is closed and the waste gate is partially open. In other examples, the CRV may be open before the diagnostic is engaged. The central throttle is partially open and the driver demand torque is a middle level. The engine throttle inlet pressure is at a middle level. These conditions may be indicative of operating the engine at part load.

At time T1, the engine enters a CRV diagnostic mode in response to operating conditions being conducive to updating a CRV transfer function. The CRV may close in response to entering the CRV diagnostic mode. The waste gate remains open and the central throttle is also partially open. In some examples, the waste gate opening amount may increase when the diagnostic mode is entered. The CRV is closed loop controlled to maintain a constant engine intake manifold inlet pressure at a predetermined value. In one example, the CRV position may be closed loop adjusted in response to central throttle inlet pressure. The driver demand torque and the central throttle inlet pressure remain at middle levels.

Between time T1 and time T2, the diagnostic is active and the waste gate is partially closed. Closing the waste gate increases compressor output and the CRV position is opened to maintain a constant engine intake manifold throttle inlet pressure. Nevertheless, the throttle inlet pressure is increased for a short time in response to the waste gate closing. The engine intake manifold throttle position is adjusted to maintain a constant engine air flow. In particular, the engine throttle position opening amount is decreased to limit flow that may result from the increased intake manifold pressure. The driver demand torque remains at a constant value.

At time T2, the CRV opening amount converges to an amount that provides the desired constant engine intake manifold inlet pressure. The opening amount is indicated by leader 405. The opening amount may be compared to a base opening amount that is stored to memory. The base opening amount corresponds to a CRV position where air begins to flow through the CRV when the CRV is not degraded via fuel vapor sludge. The CRV transfer function may be revised to include an offset value that is based on the CRV position indicated by leader 405. The waste gate, central throttle position, central throttle inlet pressure, and driver demand torque remain at their previous levels.

At time T3, the compressor recirculation valve diagnostic is ceased. The compressor recirculation valve may be closed or returned to a value based on present engine operating conditions. Further, the waste gate position may be adjusted in response to closing the compressor recirculation valve. Consequently, the central throttle inlet pressure is maintained in response to closing the compressor recirculation valve.

In this way, the compressor recirculation valve offset may be determined based on a CRV position and/or a central throttle inlet pressure. Further, the remaining values in the compressor recirculation valve transfer function may be adjusted in response to the revised offset value.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising: at least partially opening a waste gate and adjusting a compressor recirculation valve to a closed position in response to a request; at least partially closing the waste gate after at least partially opening the waste gate; adjusting a position of the compressor recirculation valve to maintain a substantially constant central throttle inlet pressure in response to the at least partial closing of the waste gate; adjusting a compressor recirculation valve airflow offset in response to the adjusted position of the compressor recirculation valve, and operating the compressor recirculation valve in response to the adjusted compressor recirculation valve airflow offset.

2. The method of claim 1, where the request includes a request to adjust the compressor recirculation valve airflow offset, and wherein the request ends in response to a threshold change in torque request.

3. The method of claim 1, further comprising adjusting a position of a central throttle to maintain a substantially constant engine airflow, and wherein the compressor recirculation valve airflow offset represents an angular position of the compressor recirculation valve at which airflow begins.

4. The method of claim 1, where the compressor recirculation valve is operated in a closed loop mode where the compressor recirculation valve position is adjusted in response to the central throttle inlet pressure.

5. The method of claim 4, where the compressor recirculation valve is at least partially opened in response to the at least partially closing the waste gate, and wherein the method is performed while an engine speed and a load are substantially constant.

6. The method of claim 1, where the waste gate is at least partially closed in a step-wise manner in a compressor recirculation valve adaptation mode, and further comprising exiting the compressor recirculation valve adaptation mode in response to an increase in driver demand torque.

7. The method of claim 1, where the compressor recirculation valve airflow offset is an opening position of the compressor recirculation valve where airflow greater than a threshold amount is present.

8. A method, comprising: partially opening a waste gate, adjusting a compressor recirculation valve to a closed position, and maintaining a constant engine throttle inlet pressure via adjusting a position of the compressor recirculation valve in response to a request after the compressor recirculation valve has closed; at least partially closing the waste gate after the compressor recirculation valve is closed; adjusting a compressor recirculation valve transfer function in response to a position of the compressor recirculation valve where the constant engine throttle inlet pressure is maintained after the waste gate is at least partially closed; and operating the compressor recirculation valve in response to the adjusted compressor recirculation valve transfer function.

9. The method of claim 1, where the compressor recirculation valve is closed loop controlled responsive to an engine intake throttle inlet pressure, wherein the compressor recirculation valve airflow offset represents an angular position of the compressor recirculation valve at which airflow begins.

10. The method of claim 8, where the request is a compressor recirculation valve request, and wherein the method is performed an engine speed and a load are substantially constant.

11. The method of claim 8, where the request initiates a request mode, and further comprising adjusting an engine intake manifold throttle to provide a constant engine air flow during the request mode, and wherein the request mode ends in response to a threshold change in torque request.

12. The method of claim 11, further comprising exiting the diagnostic mode in response to an increase in driver demand torque.

13. The method of claim 8, where the compressor recirculation valve is positioned in parallel with a compressor.

14. A system, comprising:
an engine;
a turbocharger including a compressor mechanically coupled to the engine, the turbocharger including a waste gate;
a recirculation valve positioned in an air intake of the engine in parallel with the compressor; and
a controller including instructions stored in non-transitory memory for at least partially closing an at least partially open waste gate and adjusting a transfer function of the recirculation valve based on the at least partially closing the at least partially open waste gate in response to a request to adapt operation of the recirculation valve, wherein the recirculation valve is adjustable to a plurality of positions between fully open and fully closed, the recirculation valve being actively controlled by the controller.

15. The system of claim 14, further comprising additional instructions to closed loop control the recirculation valve to maintain a constant engine intake manifold throttle inlet pressure.

16. The system of claim 14, where an offset value of the transfer function is adjusted, and wherein the instructions further include at least partially opening the recirculation valve in response to the at least partially closing the waste gate.

17. The system of claim 16, further comprising additional instructions to maintain a constant engine air flow via adjusting a position of an engine intake manifold throttle, and to at least partially open the wastegate in response to the at least partially closing the recirculation valve.

18. The system of claim 14, where the recirculation valve is initially closed in response to the request to adapt operation of the recirculation valve.

19. The system of claim 18, further comprising additional instructions for exiting a recirculation valve diagnostic mode in response to an increase in driver demand torque.

20. The system of claim 14, further comprising additional instructions to operate the recirculation valve in response to the transfer function, and wherein the diagnostic is performed while an engine speed and a load are substantially constant.

* * * * *

UNITED STATES PATENT AND TRADEMARK OFFICE
CERTIFICATE OF CORRECTION

PATENT NO. : 9,745,906 B2
APPLICATION NO. : 14/566488
DATED : August 29, 2017
INVENTOR(S) : Baitao Xiao et al.

Page 1 of 1

It is certified that error appears in the above-identified patent and that said Letters Patent is hereby corrected as shown below:

In the Claims

Column 11, Line 28, Claim 10, should read "method is performed while an engine speed".

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*